United States Patent [19]

Battle

[11] 4,131,848
[45] Dec. 26, 1978

[54] DIGITAL LOOP DETECTOR WITH AUTOMATIC TUNING

[75] Inventor: Francis L. Battle, Austin, Tex.

[73] Assignee: Gulf & Western Industries, Inc., New York, N.Y.

[21] Appl. No.: 747,171

[22] Filed: Dec. 3, 1976

[51] Int. Cl.² .................. G01R 33/12; G08G 1/01
[52] U.S. Cl. .......................... 324/236; 340/38 L; 340/551
[58] Field of Search .............. 340/38 R, 38 L, 258 C, 340/258 R; 324/41, 236, 226; 235/92 TC

[56] References Cited
U.S. PATENT DOCUMENTS

| | | | |
|---|---|---|---|
| 3,868,626 | 2/1975 | Masher | 340/38 L |
| 3,873,964 | 3/1975 | Potter | 340/38 L |
| 3,875,525 | 4/1975 | Ballinger et al. | 340/38 L |
| 3,875,555 | 4/1975 | Potter | 340/38 L |
| 3,943,339 | 3/1976 | Koerner et al. | 340/38 L |
| 3,980,867 | 9/1976 | Potter | 340/38 L |
| 3,989,932 | 11/1976 | Koerner | 340/38 L |
| 4,075,563 | 2/1978 | Battle | 340/38 L |

Primary Examiner—John W. Caldwell, Sr.
Assistant Examiner—James J. Groody
Attorney, Agent, or Firm—Meyer, Tilberry & Body

[57] ABSTRACT

A digital device for detecting a metal object in the field of influence of a detector loop controlled by an oscillator which device creates a series of counting intervals and counts pulses during the intervals. The magnitude of the count during an interval is then indicative of metal detected by the loop. The count of a prior counting interval is stored and compared with the count of the next interval to determine whether or not there has been a detection. In this type of device there is provided an improvement wherein the magnitude of the counts stored during an interval is used to change the length of subsequent counting intervals. This maintains a generally high count magnitude for the counting interval to improve the sensitivity of the detecting device.

25 Claims, 8 Drawing Figures

DIGITAL LOOP DETECTOR WITH AUTOMATIC TUNING

This invention relates to a digital loop detector of the type described in prior application Ser. No. 686,026 filed May 13, 1976, now U.S. Pat. No. 4,075,563, which prior application is incorporated by reference herein.

BACKGROUND OF INVENTION

The present invention relates to the art of digital loop detectors and more particularly to a digital loop detector with an automatic tuning circuit.

The invention is particularly applicable for a digital loop detector to be used for detecting vehicles traveling along a roadway and it will be described with particular reference thereto; however, it is appreciated that the invention has much broader applications and may be used in various digital loop detectors for a variety of uses.

The invention is particularly applicable for a digital loop detector used in detecting the presence of transitory vehicles entering and/or leaving a selected area or zone in, or associated with, a traffic intersection or selected area in a roadway. For a number of years, traffic control systems for controlling vehicle movement through intersections have been controlled, to various extends, by detectors which detect the number of vehicles entering the vicinity of the intersection. At first, these detectors were pressure treadles and other devices mechanically actuated by a passing vehicle. Such detectors were susceptible to deterioration and climate variations; therefore, other detectors were developed which did not function on mechanical principles. These involved radar sensors, magnetic pick-ups, solar units and induction loop pick-ups. Of these, one of the most predominately used mechanisms was the induction loop controlled detector. In this device, a loop is embedded in a roadway adjacent the intersection and the inductance of the loop is affected by vehicles entering and leaving the field of influence of the loop. In initial systems, the loop was connected to an oscillator. Changes in the frequency, and/or amplitude, of the oscillator output were analyzed by analog circuits for indicating a vehicle detection. Although extensively used, this type of analog system was extremely sensitive and varied substantially with the ambient conditions. In an attempt to diminish the effect of ambient conditions, some systems were provided with a fixed frequency oscillator which was beat with the loop oscillator to produce an analog signal representative of the presence of metal within the field of influence of the detecting loop. These systems did not prove extremely satisfactory because the ambient conditions still affected the operation of the loop, irrespective of the presence of metal in the field of influence. Thus, these systems often involved a feedback tuning arrangement for the fixed frequency oscillator which attempted to bring the loop oscillator and reference oscillator into a controlled relationship preparatory to detection. The feedback tuning arrangements for the fixed frequency oscillator presented difficulties which were compounded by the analog nature of the total detector system.

These disadvantages of prior attempts to use a loop detector were overcome by a digital detecting arrangement disclosed in U.S. Pat. No. 3,868,626. In this prior patent, two oscillators are employed. One oscillator has a fixed frequency and the other oscillator has a frequency varied according to the condition of the detector loop. This type of system creates a pulse count during a counting interval. Detection can be recorded either by varying the counting interval by the loop controlled oscillator or by varying the rate or frequency of the count pulse created by the loop controlled oscillator. In either arrangement, when the pulse count of a given counting interval differs from the reference count, by a threshold number or magnitude, detection is indicated. These systems have been quite successful in overcoming the disadvantages of prior systems for using a loop to detect the presence of a vehicle adjacent an intersection. The oscillators do not require periodic tuning with respect to each other during the continued operation of the detector. The detection is positive and the sensitivity of the detector system can be controlled by changing the threshold number or magnitude. The present invention relates to an improvement in a digital loop detector, as shown in U.S. Pat. No. 3,868,626, which improvements involve an automatic tuning network wherein the magnitude of the count pulse during a counting interval can be varied to maintain a relatively high number of counts. This increases the sensitivity of the digital detector. In accordance with the present invention, the general magnitude of the pulse count during a counting interval can be retained in a general range which range is sufficiently high to maintain a high sensitivity for the operation of the digital loop detector. Prior U.S. Pat. No. 3,868,626 is incorporated by reference herein as background information.

OTHER PRIOR PATENTS RELATING TO DIGITAL LOOP DETECTORS

U.S. Pat. Nos. 3,873,964 and 3,875,555 each relates to a digital loop detector and are made of record in the specification. Each of these systems involves the variation of either the loop oscillator or the reference oscillator for turning the two oscillators to a selected position which is not required in the present invention.

STATEMENT OF INVENTION

In accordance with the present invention, there is provided an improvement in a digital device for detecting a metal object in the field of influence of a dedector loop controlling an oscillator, which digital device includes means for creating a series of counting intervals, counting means for counting pulses during a current counting interval, with the magnitude of the pulse count during an interval being indicative of metal detected by the loop, means for storing a pulse count of a prior counting interval and means for indicating a detection when the pulse count of a current interval differs from the stored pulse count by at least a selected amount. The improvement in this device comprises a reading means for creating a signal when the pulse count of a count interval differs in a selected numerical direction from a selected count magnitude and magnitude shifting means responsive to the signal for shifting the magnitude of the pulse count of subsequent counting intervals toward the selected count magnitude.

By utilizing the invention as defined above, the pulse count for a count interval can be maintained at a preselected level irrespective of parameter changes in the operation of the total digital detector. Thus, the sensitivity of the detector system, which is controlled basically by the level of the pulse counting during the counting interval, can be maintained at a relatively high level. In other words, a high pulse count level or magnitude can be maintained for subsequent counting intervals so that slight variations in the oscillator controlled by the detecting loop causes substantial differences in the number of counts being recorded or accumulated during a counting interval. This maintains a high level of sensitivity for the overall detector system.

The primary object of the present invention is the provision of an automatic tuning device for a digital loop detector using a pulse counting feature, which device automatically maintains at least a preselected sensitivity even with substantial parameter fluctuations in the total detecting system.

Another object of the present invention is the provision of an automatic tuning device as defined above, which device maintains a preselected minimum sampling count over numerous counting intervals.

Yet another object of the present invention is the provision of an automatic tuning device, as defined above, which device can be used with a variety of digital loop detectors to increase the sensitivity level of the detectors.

Another object of the present invention is the provision of an automatic tuning device for a digital loop detector, as defined above, which detector is economical to produce and requires a relatively simple logic network added to the digital loop detector system.

These and other objects and advantages will become apparent from the following description taken together with the accompanying drawings.

BRIEF DESCRIPTION OF THE DRAWINGS

In the drawings of this application, the following views are found.

PREFERRED EMBODIMENT OF THE INVENTION

Figure 1:
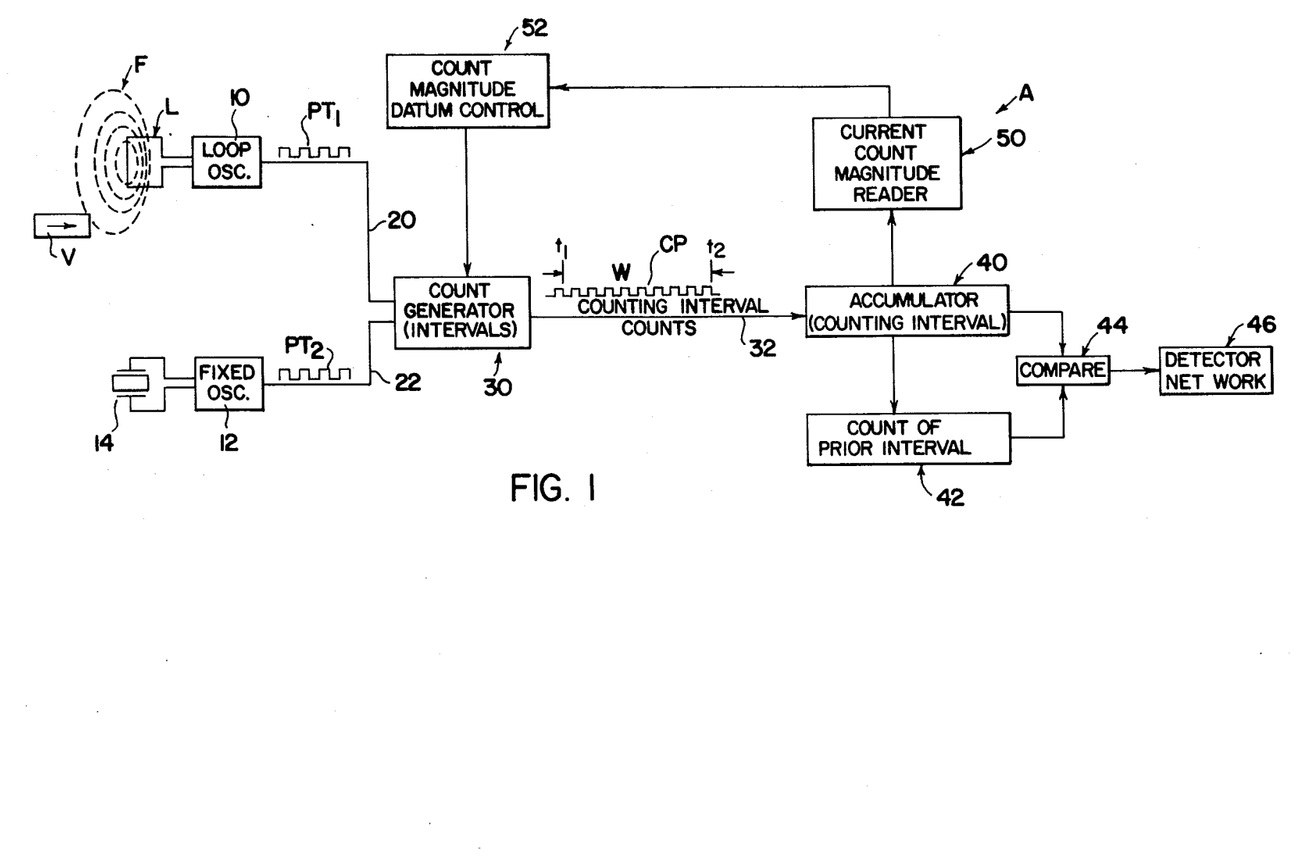
FIG. 1 is a block diagram showing certain aspects of the present invention.

Referring now to the drawings, wherein the showings are for the purpose of illustrating a preferred embodiment of the invention only, and not for the purpose of limiting same, FIG. 1 shows a digital loop detector device, or system, A which is controlled by a loop L for detecting the presence of a metal object, such as a vehicle V, as it passes into the field of influence F of the loop. Prior U.S. Pat. No. 3,868,626 is incorporated by reference herein as a general background of this type of digital loop detectors. In addition, prior application Ser. No. 686,026 filed May 13, 1976, and now copending is also incorporated by reference herein. In accordance with the preferred embodiment of the invention, as shown in FIG. 1, loop L controls the frequency of a variable oscillator 10. A fixed, or reference, oscillator 12 is controlled by a schematically illustrated crystal 14. Lines 20, 22 receive pulse trains $PT_1$ and $PT_2$, respectively, which pulse trains are directed to the inputs of a count generator 30. In accordance with the illustrated embodiment, pulse train $PT_2$ is a fixed frequency and pulse train $PT_1$ is a variable frequency determined by the parameters of loop L, which is used to detect the presence of a metal object, such as vehicle V. Count generator 30 is used to create counting pulses CP during an enabling window W, which is defined between spaced time indicating indicia $t_1$, $t_2$. Thus, during the enabling window W counting pulses CP are created. The spacing between $t_1$, $t_2$ is a counting interval CI. As the inductance changes, the pulse count occurring between the boundary times $t_1$, $t_2$ changes. This can be done by changing the rate of the counting pulses CP or by changing the length of the counting interval, or window, W. In the preferred embodiment of the invention, the length of the window W or counting interval CI is varied to change the amount of counts accumulated during a counting interval under the control of loop L. In accordance with past practices, an accumulator 40 accumulates the counting pulses CP for a single counting interval. An appropriate storing device 42, which may be a memory unit, stores the pulse count for a previous counting interval. In the preferred embodiment, the previous interval is the next preceding interval to the one being accumulated in accumulator 40. A comparing system 44 then compares the accumulated count in accumulator 40 with the stored count in storage device or unit 42. When there has been a comparison, this fact is detected by the comparing system 44 which then measures a certain amount of over counts, or under counts, to provide a detection by a detecting network 46 which indicates the presence of a vehicle or other detected object.

In some instances, after a counting interval, a detection may be indicated by a lesser number of counts in accumulator 40 than in the storing device 42. Under normal practice, as shown in the preferred embodiment, detection is indicated when the accumulator accumulates a number of counts greater than the stored counts from the last counting interval, which number is a selected over count number indicating a rapid change in the parameters of the detecting loop L. This is the normal operation of some loop detectors shown in the prior art patents mentioned in the specification. The present invention relates to an arrangement for changing the magnitude of counting pulses CP during a counting interval so that they exceed a preselected magnitude. To accomplish this, as schematically shown in FIG. 1, there is provided a reading means or network 50 to read the current magnitude of the pulse count accumulated during a counting interval. If this magnitude is not sufficiently high, as programmed into the system A, the count magnitude datum control 52 then modifies the count generator 30 to increase the datum counting pulses CP to increase the magnitude for the next counting interval. By changing the magnitude for one or more subsequent counting intervals, eventually the magnitude of the counting pulses being accumulated in accumulator 40 for a counting interval will exceed the minimum magnitude for which system A is adjusted. Then, the accumulator operates at a magnitude greater than preselected low magnitude so that the number of counts being accumulated for counting intervals and also for the storing step of the system, will exceed a preselected lower magnitude. This maintains a high magnitude of counting pulses CP so that the system A operates at a high count level. As is well known, the higher the count level the more the sensitivity which occurs for shifts in the parameters of loop L.

Figure 2:
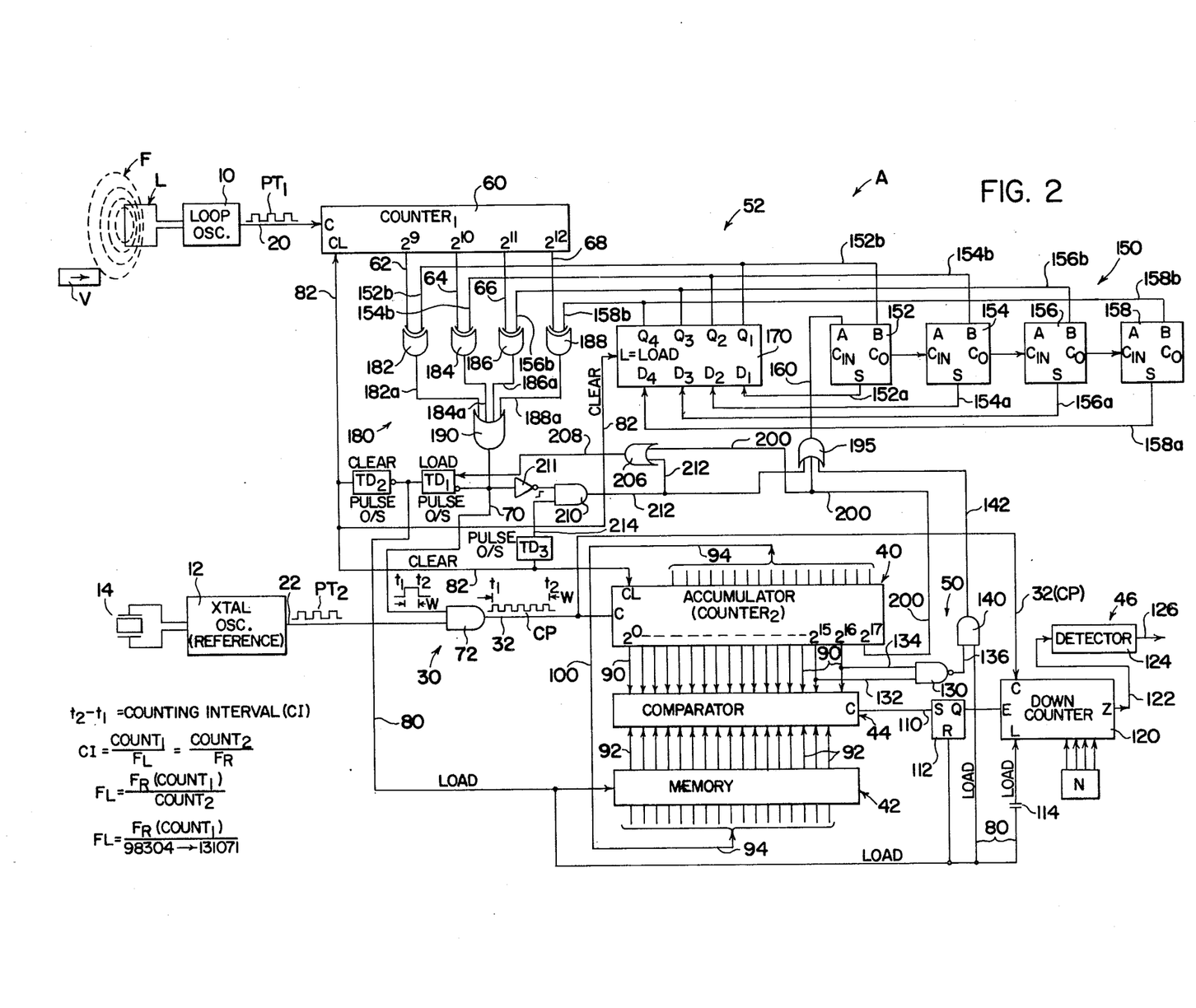
FIG. 2 is a wiring and logic diagram illustrating the preferred embodiment of the present invention together with certain formulae.

Referring now to FIG. 2, more details of the preferred embodiment of the invention are shown. Certain components generally used in digital loop detectors are illustrated somewhat schematically and various modifications therein may be made. In addition, various changes may be made in the preferred embodiment of the invention shown in FIG. 2. In the illustrated embodiment, there is provided a binary counter 60 for determining the length of the counting interval CI between times $t_1$, $t_2$. In the illustrated embodiment, a plurality of control terminals for counter 60 are connected to the higher stages of the counter. As illustrated, the terminals are provided on the $2^9$, $2^{10}$, $2^{11}$ and $2^{12}$ terminals of counter 60. These terminals are connected to lines 62, 64, 66 and 68, respectively. The control of the operative nature of lines 62–68 is involved in the improvement comprising the present invention and will be described in more detail later. At the present time, it is sufficient for a general understanding of the illustrated loop detector to indicate that when counter 60 has counted to the end of a counting interval, i.e. at time $t_2$, a logic 0 appears in the basic control line 70 of count generator 30. This control line shifts to a logic 1 at time $t_1$ and shifts back to a logic 0 at time $t_2$. Thus, the logic on line 70, in the illustrated embodiment, determines the length of window W which is the counting interval CI. A logic 1 on line 70 opens a basic control AND gate 72 of generator 30. The other input to this gate is input line 22 from fixed oscillator 12. Thus, output line 32 receives pulse train $PT_2$ for a time or period determined by window W. As the frequency of pulse train $PT_1$ in line 20 changes, the length of window W changes. Thus, the output counting pulse CP occurring during the window W determines the parameters being monitored by loop L. As a vehicle L enters the field F, the inductance of loop L changes substantially. This causes a substantial shift in the length of window W and of the counting pulses accumulated during a counting interval, which accumulated counts are referred to as the pulse count for a given counting interval. As will be explained later, time $t_1$ occurs at a CLEAR pulse for system A. Then the rate of counting of counter 60 determined by the frequency of pulse train $PT_1$ determines the amount of fixed frequency pulses in pulse train $PT_2$ which are stored in accumulator 40 during the counting interval between times $t_1$, $t_2$.

In system A, there is provided a LOAD pulse and a CLEAR pulse. These pulses may be produced and synchronized by various circuits. In the illustrated embodiment, the control pulses are synchronized with the end of a counting interval. Indeed, these pulses occur after time $t_2$ to cause a steady state loading of various components shown in FIG. 2 and then to clear the various counter sections forming accumulator 40 and counter 60. A variety of networks could be used for this purpose; however, in the illustrated embodiment, there are provided two one shot time delay devices $TD_1$, $TD_2$ which are connected in series. As the trailing edge of window W occurs, i.e. at time $t_2$, time delay $TD_1$ creates a time delay pulse in line 80 which is the LOAD line for system A. The falling edge of the LOAD pulse in line 80 then triggers the second one shot time delay device $TD_2$ which thereafter creates a CLEAR pulse in line 82 of system A. A variety of other arrangements could be used for providing LOAD, CLEAR pulses in series. However, these pulses may be adjusted to provide the necessary spacing between the time $t_2$ of one timing interval and the time $t_1$ of the next interval. The LOAD and CLEAR pulses are used in system A in a manner clearly illustrated in FIG. 2. This manner of use will be explained in more detail with respect to further description of the illustrated embodiment.

Referring now in more detail to accumulator 40 which is also indicated as $COUNTER_2$. $COUNTER_1$ is the interval counter 60 controlled by input line 20 of count generator 30. Accumulator 40 includes a counting terminal C and a clear terminal CL in a manner similar to counter 60. Upon receipt of the CLEAR pulse in line 82, the accumulator 40 and counter 60 are cleared to all zeros at the output terminals or stages. In the illustrated embodiment, accumulator 40 has 18 different stages, labeled $2^0$–$2^{17}$. In the illustrated embodiment, stages $2^0$–$2^{16}$ control the logic in parallel lines 90 at the output of accumulator 40. Stage $2^{17}$ is used for a purpose to be explained later. In a similar manner, memory unit or storing device 42 has 17 parallel output lines 92 corresponding to stages $2^0$–$2^{16}$ of a stored pulse count from a prior counting interval. At a LOAD pulse, in the illustrated embodiment, the logic on lines 90 is stored at the output lines 92 of memory unit 42. This is accomplished by 17 lines schematically illustrated as a single line 100. Consequently, after a counting interval and before accumulator 40 has been cleared by a CLEAR pulse in line 82, the logic accumulated in the accumulator is loaded into memory 42 and appears at the output lines 92 after $t_2$ of a given counting interval. Lines 90, 92 from accumulator 40 and memory 42 are directed to the comparator 44 which has a compare output terminal C. In this embodiment of the detector, when there is a matched comparison, a comparison signal appears in line 110. Thus, if accumulator 40 counts to the previously stored pulse count in memory unit 42, a signal is created in line 110. This sets flip-flop 112 to a logic 1 at the Q terminal. This line controls a sensitivity circuit 120, shown as a standard binary down counter having an enable terminal E, a load terminal L, a down counting terminal C, and an output zero terminal Z which produces a signal in output line 122 when down counter 120 has been counted down by the counting pulses CP in line 32. The network N is manually adjusted to set down counter 120 to a desired number at the LOAD pulse in line 80. A capacitor or other time delay device 114 allows a LOAD pulse to reset a logic 0 in the Q terminal of flip-flop 112 before the number from network N is loaded into counter 120. A signal or pulse in output line 122 actuates an appropriate detector circuit 124 having an output 126 which records a detection for use in a traffic control system or other arrangement being controlled by detection of a metal object coming into the field F of loop L. Other arrangements can be used to record a detection without departing from the present invention relating to automatic tuning.

The operation of system A, as so far explained, is substantially in accordance with prior digital loop detector technology. During the counting interval determined by counter 60, the pulse count is recorded in accumulator 40. When the pulse count reaches a value of a previous pulse count stored in memory 42, counter 120 is enabled by setting flip-flop 112. Counter 120 counts overflow pulses in line 32. If the set number of threshold number loaded into counter 120 is reached, a detection signal is created in line 122. This actuates the detector network in circuit 125 to produce a detection signal at line 126.

The basic digital detector system, as so far described, is modified in accordance with the present invention to provide a high order accumulated count in accumulator 40 during operation. If the accumulated count does not reach a given magnitude during a counting interval, the time $t_2$ is advanced by advancing the terminal end of the counting cycle in counter 60. In the illustrated embodiment, the minimum count magnitude which is to be maintained within accumulator 40 during a counting interval is 98304. This is the summation of $2^{15}$ and $2^{16}$. When the proper magnitude has been reached during a counting interval, the lines 90 connected to the $2^{15}$, $2^{16}$ stages are at a logic 1. This indicates that the desired high level magnitude has been reached during the counting interval. The pulse count is therefore greater than 98304. A logic 1 is retained in the $2^{15}$ and $2^{16}$ stages of accumulator 40 until the pulse count has reached $2^{17}$. Thus, the range during which lines 90 connected to the $2^{15}$ and $2^{16}$ terminals are logic 1 has an upper level which is 131071, or $2^{17}-1$. This particular magnitude range has been selected for the preferred embodiment of the invention; however, any additional magnitude numbers could be provided. This can be done by using a line 90 associated with another stage of accumulator 40. As will be explained later, a single stage of accumulator 40 may be used in accordance with the present invention.

In the illustrated embodiment, the count magnitude reading device 50 includes a NAND gate 130 having two inputs 132, 134 and an output 136. The output is connected as an input to AND gate 140 having an output 142 and controlled by the logic on LOAD line 80. During the counting interval if the magnitude reaches 98304, or any other preselected set amount, a logic 1 appears in both inputs 132, 134 of gate 130. Thus, output 136 is at a logic 0. In this condition, a logic 1 LOAD pulse in line 80 does not create an output pulse in line 142. If the count magnitude determined by the lines 90 being used at gate 130 does not reach the set magnitude, one or both of the input lines 132, 134 will be at a logic 0. This produces a logic 1 in line 136 which logic 1 is combined with the LOAD pulse to produce a logic 1 pulse in line 142. This pulse or signal indicates that the accumulated count during a timing interval has not reached the preselected, adjusted magnitude and the width W must be increased to increase the counting interval CI for accumulating higher counting pulses in subsequent counting intervals. In normal operation, the previously described reading device 50 operates as discussed above. However, if the count number reaches $2^{17}$, which is 131072, the lines 132, 134 shift to a logic 0. This gives an indication that the count should be increased. Even though this is an uncommon occurrence during normal operation, a circuit will be described later for handling this usual situation.

In accordance with the preferred embodiment of the invention, the count magnitude datum control device 52 includes a full adder 50 having normal terminals A, B, S, $C_{IN}$ and $C_O$. The full adder is divided into four stages 152, 154, 156 and 158; however, any number of stages could be employed in this embodiment of the invention. The sum terminals S are connected to lines 152a–158a and the B terminals are connected to lines 152b–158b. A pulse in line 160 advances the full adder to the next higher binary count; therefore, the full adder has 16 different stages from 0000 to 1111. The logic in lines 152b–158b is the condition of memory unit 170 after the next preceding pulse in line 160. The condition of the various stages of the full adder are remembered by memory unit 170 having input terminals $D_1$–$D_4$ in order of magnitude and output condition lines or memory logic condition lines $Q_1$–$Q_4$ which are connected to and control the logic on lines 152b–158b at the B terminal of the full adder stages 152–158.

To provide a variable control for the end of the counting interval controlled by counter 60, this counter is provided with the network 180 formed from EXCLUSIVE OR gates 182–188. These OR gates are connected to the lines 62–68 and lines 152b–158b. The output of gates 182–188 are lines 182a–188a, which form the inputs of a coincidence OR gate 190, the output of which is the control line 70 for gate 72 in the count generator 30. Gates 182–188 compare the coincidence between the logic of memory unit 170 and the logic on the four most significant stages of counter 60. Of course, the number of the most significant stages of counter 60 which are controlled by network 180 could be varied by changing network 180. For instance, more or fewer EXCLUSIVE OR gates could be provided in the network to monitor addition of the more significant stages of counter 60.

The operation of the automatic tuning arrangement for maintaining high order counts during a counting interval is quite apparent from FIG. 2. Basically, if the count accumulated during a given counting interval by accumulator 40 exceeds the set value, in this instance 98304, a logic 1 appears in both lines 132, 134. This produces a logic 0 in line 136 which latches AND gate 140 to a logic 0 in output 142 connected to control line 160 through OR gate 195. After the counting interval has been discontinued at time $t_2$, a LOAD pulse is received in line 80. This has no effect upon gate 140 or full adder 150. As long as this condition exists, network 180 remains in its condition and the counting interval or window W is not modified by the sensed output of gate 190. Assume now that the pulse count during a counting interval is slightly below 98304. In that instance, after the counting interval accumulator 40 will have a logic 1 at the $2^{16}$ terminal, but a logic 0 at the $2^{15}$ terminal. Thus, a logic 0 appears in line 132. This produces a logic 1 in line 136 which logic 1 is retained after the counting interval has been completed. Thereafter, a LOAD pulse in line 80 produces a logic 1 pulse in line 142. This advances stages 152 of full adder 150. The advance ripples through the various stages to advance the condition of terminals $D_1$–$D_4$ of memory unit 170 by a binary one. Assume now that full adder 150 has a binary 1100 in stages 152–158, respectively. In this condition, a CLEAR pulse at the LOAD terminal L of memory unit 170, loads terminals $Q_1$, $Q_2$ with a logic 1. This would produce a logic 1 in lines 152b and 154b of network 180. Thus, a logic 0 would appear in line 70 when counter 60 counts to the total of $2^9 + 2^{10}$. With the advance caused by the signal in line 160, full adder advances to the next binary state. This would be the 0100 state. In this instance, logic 1 would be loaded from the $D_3$ terminal of memory unit 170 to the $Q_3$ terminal. The other terminals would remain at a logic 0. In this instance, only control line 156b would be at logic 1. Thus, during subsequent timing intervals, a logic 0 from gate 186 would crate at $t_2$ time when counter 60 advances to the $2^{11}$ count. If this advance causes window W to be enlarged to a degree sufficient to reach the 98304 count in accumulator 40, no further advance takes place in full adder 150. If this change in network 180 is not sufficient to increase the count to above 98304, another pulse appears at line 160 after the next successive counting interval. This would cause line 152b to go to a logic 1. In this manner, the $t_2$ time or window W would have a length determined by the number $2^9 + 2^{11}$. This continues until the counting interval is sufficiently long to maintain a count in accumulator 40 above the preselected adjusted pulse count magnitude.

If the accumulated count in accumulator 40 is below $2^{15}$, both lines 132, 134 are at a logic 0. This also produces an advance or KICK pulse in line 160. The number of stages of the full adder is selected so that in normal operations the maximum time interval will not exceed $2^{12}$ at interval counter 60. If additional capacity is required, additional stages may be used in counter 60 and full adder 150.

By using the system as illustrated in FIG. 2, it is seen that the system automatically increases the pulse count being accumulated during a counting interval for the digital loop detector system A to a value exceeding a preselected count magnitude. In this manner, the sensitivity of the system A is retained in a relatively high condition. The numbers and terminals can be adjusted to provide various sensitivity in adjusted states.

The system as so far described has two conditions which do not occur during normal operation but which may occur in ususual circumstances. In one of these instances, there is a possibility of an overrun of accumulator 40 wherein the accumulator reaches the $2^{17}$ stage. In that instance, there is a higher pulse count than contemplated by the illustrated embodiment. However, such a high pulse count condition would produce a logic 0 in lines 132, 134. This will generate a KICK pulse in line 160 at the end of a counting interval. With a sufficient number of KICK pulses, full adder 150 will roll over to the 0000 condition. This reduces the accumulated count pulses. However, this cycling may require a large number of counting intervals to be accomplished. For that reason, an overrun network is provided. This network includes a line 200 connected to the $2^{17}$ terminal of accumulator 40. A logic 1 in this terminal produces a logic 1 at a second input of gate 195. This produces a KICK pulse in line 160. This KICK pulse occurs as soon as the $2^{17}$ condition exist. In this manner, full adder 150 is immediately advanced. At the same time, line 200 actuates an OR gate 206 having an output 208. The logic 1 in this line actuates the positive input of time delay one shot device $TD_1$. This produces a LOAD pulse and than a CLEAR pulse. Thus, as soon as the $2^{17}$ condition exist, memory 170 is updated and a new counting interval is started. This sequence is continued until the full adder is advanced and rolled over to produce a shorter counting interval. At that time, gate 130 takes over and advances the time $t_2$ to the desired level. Other arrangements could be controlled by the $2^{17}$ terminal for rapidly rolling over the full adder. For instance, a pulse in the $2^{17}$ terminal of accumulator 40 could reset the four stages of memory 170 to a logic 0 condition. This would apply a logic 0 to the B terminals of stages 152-158 of full adder 150. Thereafter, the first KICK pulse would actuate line 152b to set network 180 to the lowest possible counting interval level.

In some circumstances, all stages of the full adder 150 may be a logic 0. This would produce a logic 0 in line 70 at a CLEAR pulse starting a counting interval. Thus, the line 70 would not shift to a logic 1 at the $t_1$ time. To correct this situation, a variety of circuits could be used. One circuit schematically illustrated in FIG. 2 includes an anti-coincident AND gate 210 which has an output 212 connected to the third input of gate 195. The output of this gate is control line 160 of the full adder. Gate 210 is controlled by line 70 through inverter 211 and by a one shot time delay device TD3. This device produces a logic 1 pulse in line 214 at a selected time after a CLEAR pulse. Thus, if a logic 0 exist in line 70 a short time after a CLEAR pulse in line 82, inverter 211 is at a logic 1 and time delay TD3 will shift to a logic 1. This produces a logic 1 pulse in line 212. This produces a KICK pulse in line 160 which advances full adder 150. In addition, line 212 produces a pulse in output line 208 of gate 206. This produces a LOAD pulse and a CLEAR pulse. Thus, the counting interval is restarted with a logic 1 in line 152b. This removes the improper coincidence condition of network 180 and allows creation of the logic 1 condition in line 70 at the CLEAR pulse used to start a counting interval. Other arrangements could be used to prevent an improper coincidence condition of network 180 at the beginning of a timing interval.

Figure 3:
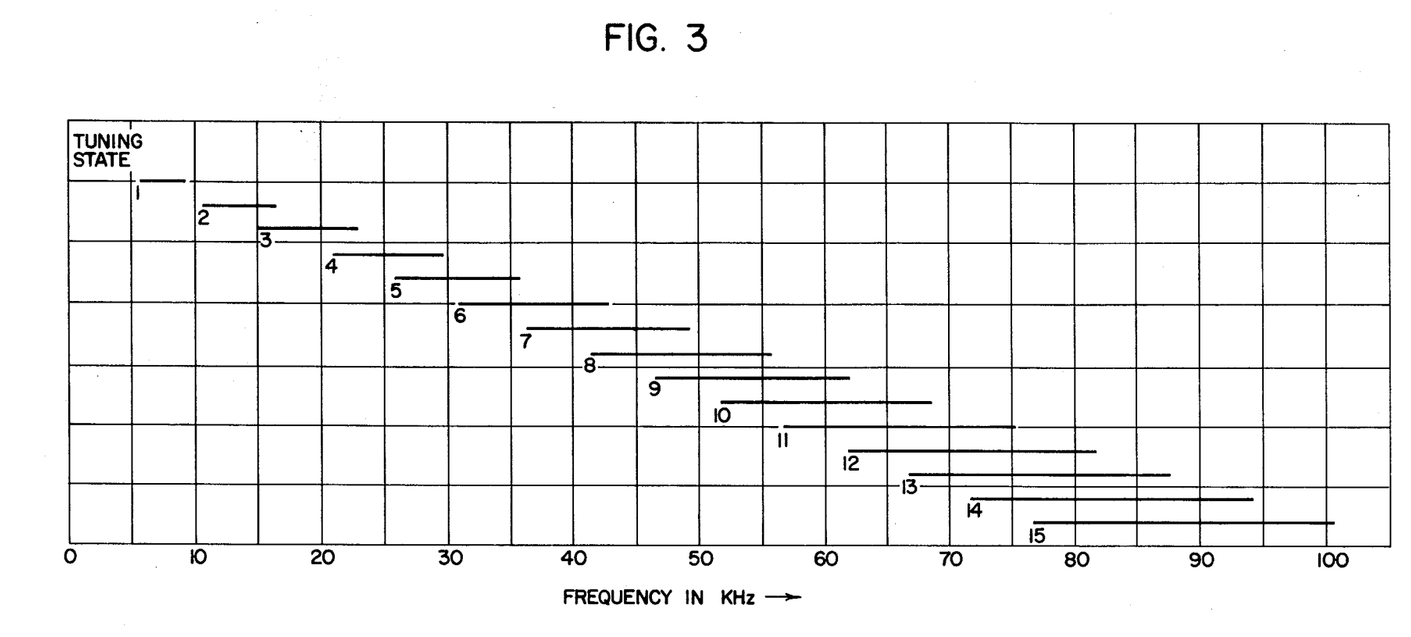
FIG. 3 is a graph illustrating the frequency shift when employing the preferred embodiment of the invention as illustrated in FIG. 2.

Referring now to FIG. 3, this is a chart indicating the operation of the embodiment shown in FIG. 2 for a reference frequency of 1.3 megahertz. The elongated lines labeled 1-5 are the frequency range of the variable oscillator 10 at different conditions of network 180. This illustrates the frequency range which will create the $t_2$ condition at various settings of the full adder 150. It can be seen that the higher the state of the full adder the wider the range which will produce a KICK pulse in line 160.

Figure 4:
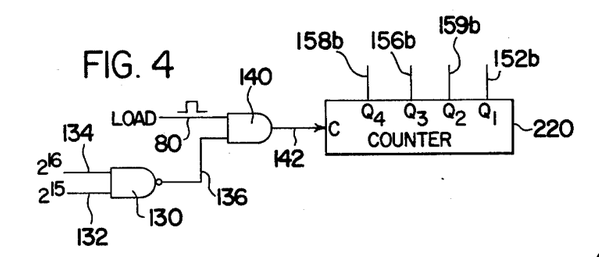
FIG. 4 is a schematic, partial logic diagram illustrating a modification of the preferred embodiment shown in FIG. 2.
Figure 5:
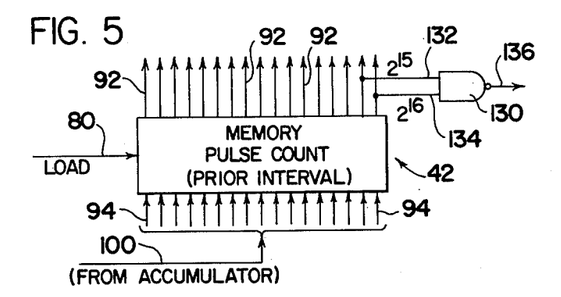
FIG. 5 is a partial view showing still a further modification of the preferred embodiment of the invention.
Figure 6:
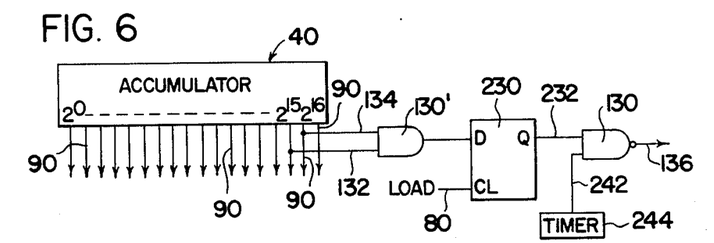
FIG. 6 is an additional partial view illustrating still a further modification of the preferred embodiment.
Figure 7:
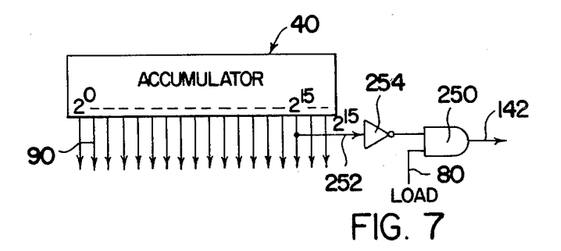
FIG. 7 is a further partial view illustrating an additional modification of the preferred embodiment as illustrated in FIG. 1; and, FIG. 8 is a partial view showing another modification of the preferred embodiment of the invention.

Referring now to FIG. 4, a modification of the preferred embodiment is illustrated. In this instance, a four stage binary counter replaces full adder 150 and memory unit 170. Binary counter 220 counts to a digital 15 and then rolls over and continues to count. Otherwise, the system operates substantially in accordance with the previous description. There is no logic transfer, as required by memory 170. A further modification is illustrated in FIG. 5 wherein lines 132, 134 are controlled by the $2^{15}$ and $2^{16}$ lines 92 at the output of memory device 42. This illustrates that the magnitude condition may be read at various positions in a digital loop detector system, such as shown in FIG. 2. FIG. 6 illustrates that the existence of an improperly low magnitude for the pulse count during a counting interval may be stored for periodic updating of full adder 150 or binary counter 220. In this instance, the reading gate 130' reads the condition of lines 132, 134. This condition controls the D terminal of the standard D-type flip-flop 230 which is clocked by a LOAD pulse in line 80. The Q terminal of flip-flop 230 is connected to a line 232 which controls the standard reading NAND gate 130. The other input to this NAND gate is 242 which is controlled by a timer 244. This timer can be a counting or dividing circuit controlled by the logic on line 70. In other words, after a certain number of intervals, a KICK pulse can be created in line 136 if the conditions of the pulse count in accumulator 40 so require. In addition, the timer 244 may be independent of the counting intervals and appear at preselected intervals in the operation of digital loop detector system A. Thus, the magnitude reading device can store the requested updating of network 180 for subsequent updating which is not controlled by the normal LOAD pulse at the end of each counting interval. Still a further modification of the invention is illustrated in FIG. 7 wherein an AND gate 250 is used for reading the magnitude level of accumulator 40. In this arrangement, line 252 is connected to the $2^{15}$ terminal of accumulator 40. An inverter 254 controls one input to gate 250. If the magnitude of the pulse count during a counting interval is less than $2^{15}$, a logic 1 appears at one input of gate 250. The LOAD pulse in line 80 then produces a KICK pulse in line 142 for advancing the full adder 150 or counter 220 shown in FIG. 4. In the modification shown in FIG. 7, an overrun condition would exist when accumulator 40 reaches the $2^{16}$ count condition. This could control the line 200, as illustrated in FIG. 2. From these modifications it is clear that various magnitudes may be read by the count magnitude reader 50 as schematically illustrated in FIG. 1.

Figure 8:
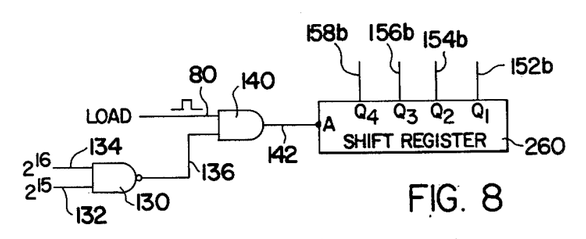

Although either a full adder or a binary counter is preferred for updating network 180, it is possible to provide a shift register 260 as shown in FIG. 8. In this manner, the logic on lines 152b–158b have a single logic 1 which is advanced from position-to-position. In this manner, network 180 will provide coincidence at advancing terminals of counter 60. This provides a less precise adjustment for the network 180 and could be used in some systems. However, the binary counter or full adder previously discussed are preferred and are used in practice.

In the illustrated embodiment, a LOAD pulse and a CLEAR pulse are created in sequence at the end of a counting interval, by any appropriate arrangement. The LOAD pulse resets flip-flop 112 to disable counter 120, loads the prior pulse count into memory 42 and, then, loads the sensitivity number from network N into counter 120 after a delay caused by a delay device, such as capacitor 114. The CLEAR pulse then clears accumulator 40 and counter 60. This starts a new counting cycle or interval. Other arrangements could be used for sequencing system A to use the self-tuning concept of the present invention.

Having thus defined the invention, it is claimed:

1. In a digital device for detecting a metal object in the field of influence of a detector loop controlling an oscillator, said digital device including means for creating a series of counting intervals; pulse counting means for counting pulses during a current counting interval, with the magnitude of the pulse count during an interval being indicative of metal detected by said loop; means for storing a pulse count of a prior counting interval; and means for indicating a detection when said pulse count of a current interval differs from said stored pulse count by at least a selected amount, the improvement comprising: reading means for creating a signal when said pulse count of a counting interval differs in a selected numerical direction from a selected count magnitude, and shifting means responsive to said signal for shifting the length of subsequent counting intervals toward a length producing a pulse count including said selected count magnitude.

2. The improvement as defined in claim 1 wherein said pulse counts for a timing interval are accumulated in a digital counting device and said reading means includes means for indicating the existence of a given count magnitude in said counting device.

3. The improvement as defined in claim 2 wherein said shifting means includes a loop counter means for counting pulses from said oscillator controlled by said loop and means for controlling the length of counting intervals in response to a given number of counts from said oscillator controlled loop as counted by said loop counter means.

4. The improvement as defined in claim 3 including means for changing said number of counts for controlling said length in response to said signal.

5. The improvement as defined in claim 1 wherein said shifting means includes a loop counter means for counting pulses from said oscillator controlled by said loop and means for controlling the length of counting intervals in response to a given number of counts from said oscillator controlled loop as counted by said loop counter means.

6. The improvement as defined in claim 5 including means for changing said number of counts for controlling said length in response to said signal.

7. The improvement as defined in claim 1 wherein the length of said counting interval is determined by a loop counter means for counting pulses from said loop controlled oscillator, and said shifting means includes a logic network controlled by a number of most significant stages of said counter means, and means for changing the most significant stages used to control said logic network in response to said signal.

8. The improvement as defined in claim 7 wherein said changing means is a full adder having a number of stages each of which renders one of said most significant stages of said counter means operative and means for advancing said full adder in response to said signal.

9. The improvement as defined in claim 8 including means for connecting said stage of said full adder in advancing order with the most significant stages of said loop counter means.

10. The improvement as defined in claim 9 including means for indexing the operative state of said most significant stages of said loop counter means a given binary count amount by said signal.

11. The improvement as defined in claim 10 wherein said indexing means shifts operative states in a binary counting fashion.

12. The improvement as defined in claim 11 including means for allowing creation of one of said signals after each of said counting intervals.

13. The improvement as defined in claim 8 including means for indexing the operative state of said most significant stages of said loop counter means a given binary count amount by said signal.

14. The improvement as defined in claim 13 wherein said indexing means shifts said operative states in a binary counting fashion.

15. The improvement as defined in claim 14 including means for allowing creation of one of said signals after each of said counting intervals.

16. The improvement as defined in claim 7 including means for indexing the operative state of said most significant stages of said loop counter means a given binary count amount by said signal.

17. The improvement as defined in claim 16 wherein said indexing means shifts said operative states in a binary counting fashion.

18. The improvement as defined in claim 17 including means for allowing creation of one of said signals after each of said counting intervals.

19. The improvement as defined in claim 8 including means for allowing creation of one of said signals after each of said counting intervals.

20. The improvement as defined in claim 7 including means for allowing creation of one of said signals after each of said counting intervals.

21. The improvement as defined in claim 1 including means for allowing creation of one of said signals after each of said counting intervals.

22. The improvement as defined in claim 7 wherein said changing means is a binary counter having a number of stages each of which renders one of said most significant stages of said counter means operative and means for advancing said binary counter in response to said signal.

23. The improvement as defined in claim 22 including means for allowing creation of one of said signals after each of said counting intervals.

24. The improvement as defined in claim 7 wherein said changing means is a ring counter having a number of stages each of which renders one of said most significant stages of said counter means operative and means for advancing said ring counter in response to said signal.

25. The improvement as defined in claim 24 including means for allowing creation of one of said signals after each of said counting intervals.

* * * * *

UNITED STATES PATENT AND TRADEMARK OFFICE
CERTIFICATE OF CORRECTION

PATENT NO. : 4,131,848
DATED : December 26, 1978
INVENTOR(S) : Francis L. Battle It is certified that error appears in the above-identified patent and that said Letters Patent are hereby corrected as shown below:

In the drawings, Sheet 4, Fig. 4, reference numeral 159b should read -- 154b --. Column 1, line 27, "extends" should read -- extents --, line 45, after "was" insert -- not --. Column 2, line 43, "dedector" should read -- detector --. Column 6, line 68, "of" should read -- or --. Column 7, line 3, reference numeral "125" should read -- 124 --; line 59, "usual" should read -- unusual --; line 62, reference numeral "50" should read -- 150 --. Column 8, line 50, "stages" should read -- stage --; line 60, after "adder" insert reference numeral -- 150 --; line 65, after "at" insert -- a --; line 66, "crate an" should read -- create a --. Column 9, lines 47 and 53, "exist" should read -- exists --; line 52, "than" should read -- then --. Column 10, line 29, "1-5" should read -- 1-15 --. Column 12, line 32, "stage" should read -- stages --.

Signed and Sealed this

Thirtieth Day of June 1981

[SEAL]

Attest:

RENE D. TEGTMEYER

Attesting Officer    Acting Commissioner of Patents and Trademarks